(12) United States Patent
Shaw et al.

(10) Patent No.: US 9,912,688 B1
(45) Date of Patent: Mar. 6, 2018

(54) METHOD AND APPARATUS FOR PROTECTING CONSUMERS AND RESOURCES IN A COMMUNICATION NETWORK

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/591,486

(22) Filed: May 10, 2017

(51) Int. Cl.
| | |
|---|---|
| H04M 1/66 | (2006.01) |
| H04L 29/06 | (2006.01) |
| H04M 3/22 | (2006.01) |
| H04W 48/02 | (2009.01) |
| H04W 8/24 | (2009.01) |
| H04W 64/00 | (2009.01) |
| H04W 12/08 | (2009.01) |

(52) U.S. Cl.
CPC ...... H04L 63/1433 (2013.01); H04M 3/2281 (2013.01); H04W 8/24 (2013.01); H04W 48/02 (2013.01); H04W 64/00 (2013.01); H04L 63/1458 (2013.01); H04M 2203/558 (2013.01); H04M 2203/6045 (2013.01); H04W 12/08 (2013.01)

(58) Field of Classification Search
CPC .......... H04L 63/1433; H04L 63/1458; H04M 3/2281; H04M 2203/558; H04M 2203/6045; H04W 48/02; H04W 8/24; H04W 64/00; H04W 12/08

USPC ........ 455/410–411, 412.1–414.2, 418–422.1, 455/26.1, 552.1, 41.1–41.2

See application file for complete search history.

(56) References Cited

U.S. PATENT DOCUMENTS

| | | | |
|---|---|---|---|
| 6,289,084 B1 * | 9/2001 | Bushnell | H04M 1/2745 379/192 |
| 7,158,630 B2 | 1/2007 | Boudrieau et al. | |
| 7,283,969 B1 | 10/2007 | Marsico et al. | |

(Continued)

OTHER PUBLICATIONS

Kaplan, Hadriel, "Secure Telephone Identity Revisited (STIR) Frequently Repeated Information and Explanation Document (FRIED)", 2013, pp. 4-7 and 21.

(Continued)

*Primary Examiner* — Babar Sarwar
(74) *Attorney, Agent, or Firm* — Guntin & Gust, PLC; Douglas Schnabel (57) ABSTRACT

Aspects of the subject disclosure may include, for example, a method including comparing call volume of call sessions associated with a wireless network node of a communication network to a threshold volume to identify a suspicious communication event, identifying robotic calls in the call sessions associated with the suspicious communication event, identifying a mobile communication device associated with the robotic calls, providing, by the processing system, identification information associated with the mobile communication device to a core network function of the communication network and a second wireless network node of the communication network according to a robotic call policy. Other embodiments are disclosed.

20 Claims, 6 Drawing Sheets

(56) References Cited

U.S. PATENT DOCUMENTS

| | | | |
|---|---|---|---|
| 7,307,997 B2 | 12/2007 | Vinokurov et al. | |
| 7,577,239 B1* | 8/2009 | Shim | H04M 3/436 379/114.04 |
| 7,587,040 B2 | 9/2009 | Noble et al. | |
| 7,912,192 B2 | 3/2011 | Rosencrantz et al. | |
| 8,094,800 B1* | 1/2012 | Smith | H04M 3/436 379/210.02 |
| 8,238,532 B1 | 8/2012 | Cox et al. | |
| 8,270,588 B2* | 9/2012 | Schwartz | H04M 3/436 379/201.02 |
| 8,750,482 B2* | 6/2014 | Chingon | H04M 1/573 379/142.04 |
| 8,886,663 B2* | 11/2014 | Gainsboro | G06F 17/30398 379/88.01 |
| 8,917,843 B2* | 12/2014 | Sharpe | H04M 3/4365 379/142.15 |
| 9,001,985 B2 | 4/2015 | Cox et al. | |
| 9,002,320 B2* | 4/2015 | Jiang | H04M 15/00 379/114.14 |
| 9,113,001 B2 | 8/2015 | Rajakumar et al. | |
| 9,154,597 B2 | 10/2015 | Cook | |
| 9,160,846 B2 | 10/2015 | Daniel et al. | |
| 9,232,056 B2 | 1/2016 | Liu | |
| 9,253,010 B1 | 2/2016 | Nachenberg | |
| 9,332,119 B1 | 5/2016 | Danis | |
| 9,350,858 B1* | 5/2016 | Roths | H04M 3/4365 |
| 9,553,985 B2 | 1/2017 | Cohen | |
| 9,560,198 B2 | 1/2017 | Farrand et al. | |
| 9,591,464 B2* | 3/2017 | Jawaharlal | H04W 4/12 |
| 2001/0033643 A1 | 10/2001 | Mulvey et al. | |
| 2003/0063590 A1* | 4/2003 | Mohan | H04L 29/06027 370/338 |
| 2005/0243975 A1* | 11/2005 | Reich | H04L 12/66 379/88.01 |
| 2007/0071212 A1 | 3/2007 | Quittek et al. | |
| 2008/0292077 A1 | 11/2008 | Vinokurov et al. | |
| 2009/0043573 A1* | 2/2009 | Weinberg | G10L 17/06 704/223 |
| 2009/0070334 A1* | 3/2009 | Callahan | G06F 21/604 |
| 2009/0168755 A1 | 7/2009 | Peng et al. | |
| 2009/0202057 A1* | 8/2009 | Tartarelli | H04L 29/06027 379/142.04 |
| 2010/0158227 A1* | 6/2010 | Grandhi | H04M 3/42042 379/142.17 |
| 2011/0183646 A1* | 7/2011 | Kramarz-vonKohout | H04L 63/10 455/411 |
| 2012/0254982 A1* | 10/2012 | Sallam | G06F 21/564 726/16 |
| 2014/0192965 A1 | 7/2014 | Almeida et al. | |
| 2015/0195403 A1 | 7/2015 | Goulet et al. | |
| 2016/0050316 A1* | 2/2016 | Jain | H04M 3/4365 379/221.14 |
| 2016/0142540 A1* | 5/2016 | Hickey | H04M 3/436 379/210.02 |
| 2016/0150414 A1* | 5/2016 | Flaks | H04W 12/12 455/406 |
| 2016/0309024 A1* | 10/2016 | Quilici | H04M 3/436 |
| 2017/0054854 A1 | 2/2017 | Richards et al. | |
| 2017/0099388 A1* | 4/2017 | Bensman | H04M 3/436 |
| 2017/0134575 A1* | 5/2017 | Quilici | H04M 3/436 |

OTHER PUBLICATIONS

Kutler, Alison, "Re: ATIS' Work Programs Related to Caller ID Spoofing, Robocall Mitigation Techniques Ex Parte, CG Docket No. 02278, WC Docket No. 07135, WC Docket No. 1339", 2016.

Tu, Huahong et al., "Toward authenticated caller Id transmission: The need for a standardized authentication scheme in Q. 731.3 calling line identification presentation", ITU Kaleidoscope: ICTs for a Sustainable World (ITU WT), IEEE, 2016.

Xiao, Liang et al., "A Mobile Offloading Game Against Smart Attacks", IEEE Access Year: 2016, vol. 4, 2016, 2281-2291.

\* cited by examiner

METHOD AND APPARATUS FOR PROTECTING CONSUMERS AND RESOURCES IN A COMMUNICATION NETWORK

FIELD OF THE DISCLOSURE

The subject disclosure relates to a method and apparatus for protecting consumers and resources in a communication network.

BACKGROUND

There is an expanding ecosystem of devices that people use to access applications and information, or interact with others, and monitor or control processes. This ecosystem can go beyond desktop, laptop, and tablet computers to encompass the full range of endpoints with which humans might interact. Devices are increasingly connected to back-end systems through various networks, but often operate in isolation from one another. As technology evolves, it is expected that connection models will expand, flow into one another, and greater cooperative interaction between devices will emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for protecting consumers and resources in a communication network from robotic calling. A Robotic Call Traffic Management Function (RCTMF) can analyze information associated with call sessions at a wireless network node of a communication network. The RCTMF can determine a volume of calls at the wireless network node and can determine if the volume of calls are sufficient to indicate suspicious activity. If suspicious activity is indicated, then the RCTMF can sample or analyze data signal patterns associated with the call sessions occurring during the suspicious activity. The RCTMF can detect robotic call patterns in the call sessions to identify which calls, if any, appear to originate from robotic call devices.

In one or more embodiments where call sessions are identified as robotic calls, the RCTMF can determine appropriate anti-robotic calling enforcement action based on a policy enforcement function. The RCTMF can instruct the wireless network node to block further use of radio resources by a mobile communication device that is identified as the originating device for the robotic call. The RCTMF can provide the identity of the mobile communication device to one or more entities, include neighboring wireless network nodes and/or core network elements. The RCTMF can determine a physical location of the mobile communication that is originating the robotic calls and can provide this information to authorities. Further follow up can include performing spoof detection, Denial of Service (DOS), and/or quarantining on the identified mobile communication device. Other embodiments are described in the subject disclosure.

One or more aspects of the subject disclosure include a machine-readable storage medium, including executable instructions that, when executed by a processing system including a processor, facilitate performance of operations, including monitoring call sessions associated with a wireless network node of a communication network to determine a call volume associated with the wireless network node. The operations can also include comparing the call volume associated with the wireless network node to a threshold volume to identify a suspicious communication event. Responsive to identification of the suspicious communication event, the operations can include detecting robotic call patterns in the sampled data signals associated with the suspicious communication event to identify robotic calls in the call sessions associated with the suspicious communication event. Responsive to identification of the robotic calls, the operations can include identifying a mobile communication device associated with the robotic calls. The operations can further include determining an enforcement action for the mobile communication device associated with the robotic calls according to a robotic call policy and, in turn, executing the enforcement action against the mobile communication device associated with the robotic calls.

One or more aspects of the subject disclosure include a software defined network manager, comprising a processing system including a processor and a memory that stores executable instructions that, when executed by the processing system, facilitate performance of operations, including receiving call sessions accessing a communication network. The operations can include determining a call volume associated with the call sessions. The operations can include identifying a suspicious communication event according to the call volume and, responsive to identification of the suspicious communication event, identifying robotic calls in the call sessions associated with the suspicious communication event. The operations can also include identifying a mobile communication device associated with the robotic calls responsive to identification of the robotic calls. The operations can include providing identification information associated with the mobile communication device to a core function of the communication network according to a robotic call policy.

One or more aspects of the subject disclosure include a method including comparing, by a processing system including a processor, call volume of call sessions associated with a wireless network node of a communication network to a threshold volume to identify a suspicious communication event. The method can include identifying, by the processing system, robotic calls in the call sessions associated with the suspicious communication event based on detecting data signal patterns that correlate to robotic call patterns. The method can further include identifying, by the processing system, a mobile communication device associated with the robotic calls. The method can include providing, by the processing system, identification information associated with the mobile communication device to a core network function of the communication network and a second wireless network node of the communication network according to a robotic call policy.

Figure 1:
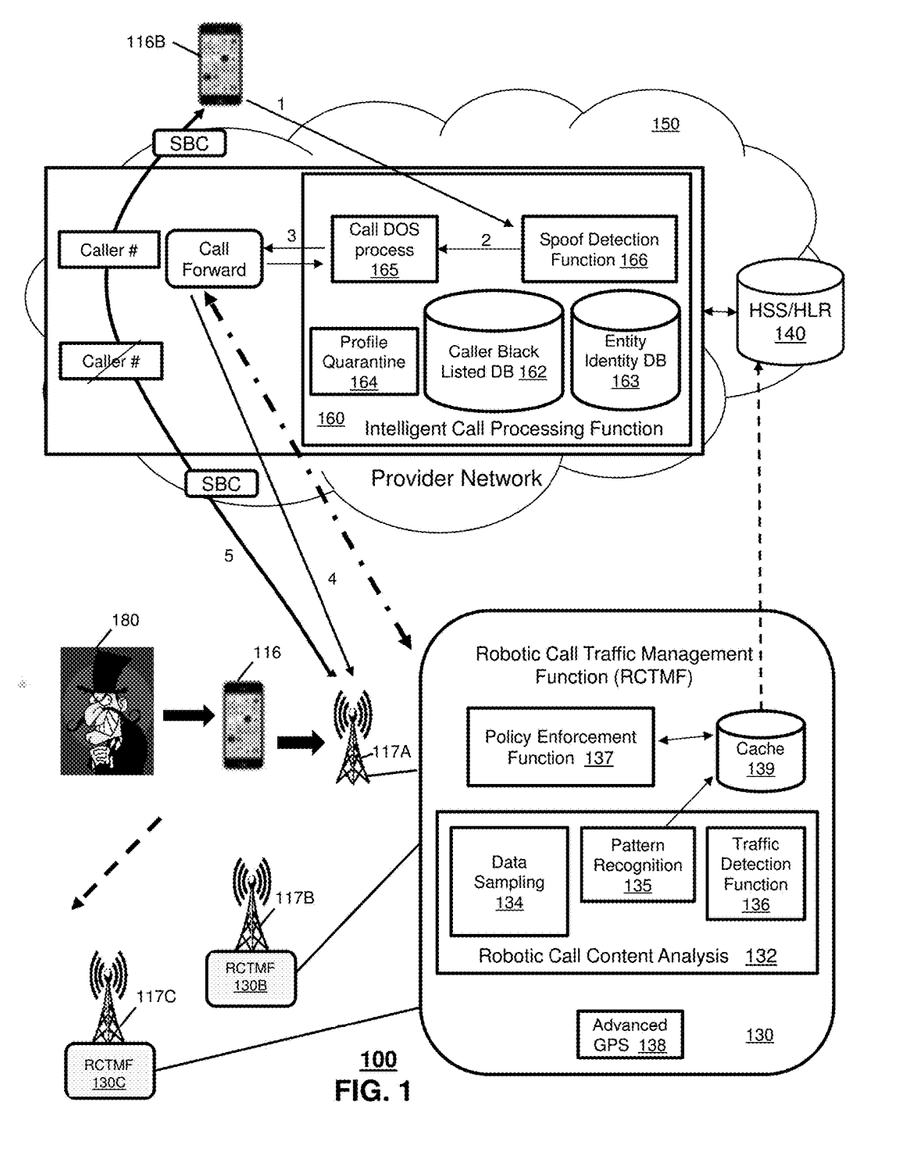
FIGS. 1 and 2 depict illustrative embodiments of exemplary communication networks capable of protecting customers and communication resources from robotic calling.

Referring now to FIG. 1, illustrative embodiments of an exemplary communication network for providing services to communication devices is shown. In one or more embodiments, a communications system 100 can include a provider communication network 150 for mobile communication and media services. The communication network can be a Long-Term Evolution (LTE) network, a 5G network, a 4G/3G network or combine elements from different generations of networking technology and/or architecture. In one or more embodiments, the communications system 100 can include wireless access nodes 117A-C for providing wireless connectivity to mobile communication devices 116 and 116B. Wireless access nodes 117A-C can be wireless access base stations and can include evolved Node B (eNodeB) capability for establishing connections between wireless mobile communication devices 106 and the Provider communication network 150.

In one or more embodiments, each mobile communication device 116 can communicate via a cellular communication link through a Radio Access Network (RAN) technology. A wireless access node 117A, such as an LTE network or a 5G network, can establish wireless communications with the communication device 116. However, the mobile communication device 116 can move between wireless access node 117A-C while maintaining a communication session. In one or more embodiments, the communication network 100 can be a converged network capable of supporting a wide range of access, core and transport networks, such as wireline, wireless, satellite, 3GGP, non-3GPP, and/or 5G.

Figure 2:
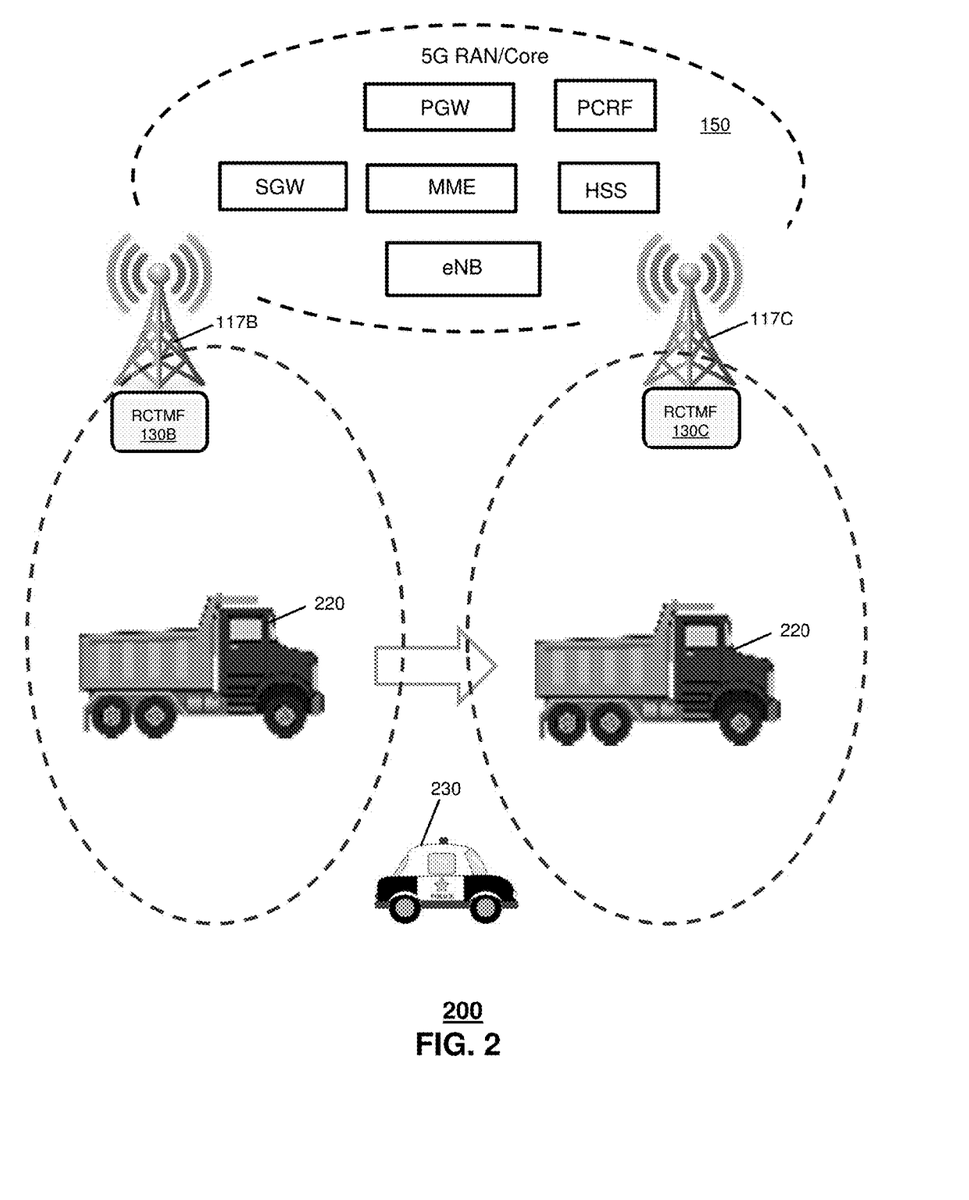

Referring to FIG. 2, illustrative embodiments depicting the problem of robotic calling in a communication system 200 are shown. Robotic calling has become a serious problem in recent years as computer automation has provided capabilities for automated dialing of very large numbers of stationary and mobile phone numbers (IMSSDNs). Further, the availability of large numbers of mobile SIM cards (ICCIDs) has created a very large combination of permutations of IMSSDNs and ICCIDs. As a result, entities can now engage in robotic calling using mobile-based devices. For example, it has been found that criminals can drive around in a mobile truck 220, which is equipped with computerized of auto dialing automation and mobile communication technology that leverages real and/or virtual IMSSDN and ICCIDs. As the mobile robotic calling truck 220 moves from location to location, wireless connectivity between the onboard mobile communication technology and the provider communication system 150 to move from wireless access node 117B to wireless access node 117C without exposing the precise location of the illegal activity to the service provider or exposing the perpetrators to great risk of getting caught by authorities (e.g., the local police).

In an illegal robotic calling event, malicious robotic calling facilities 220 can result in the generation of excessively large numbers of illegal call sessions in a single geographical area. Robotic calling events can create a sudden surge of communication traffic at a wireless access node 117B or cell site, which can result in instantaneous congestion of the telecommunications traffic in the geographical area. This robotic calling "traffic jam" can cause other calling traffic, including normal customer calls and calls associated with emergency or first responder activities (i.e., 911 services) to be slowed or even temporarily disabled due to the surge in activity. While the communication network 100 is designed to handle normal surges in activity created by customer devices, it is not intended to handle massive onslaughts of calls generated by robotic calling facilities that are capable of dialing thousands of numbers every second.

Robotic calling events are malicious and can be illegal, representing a major headache for customer satisfaction, community safety, and network integrity. Law enforcement authorities can arrest and prosecute perpetrators engaged in particular robotic calling activities. However, it is found to be difficult for network providers and/or law enforcement to identify suspicious mobile robotic calling activities, to locate mobile calling vehicles, and to interdict the criminal activities in real time. Criminals can drive around from location to location making it very difficult to identify, locate, and catch them "in the act."

Figure 3:
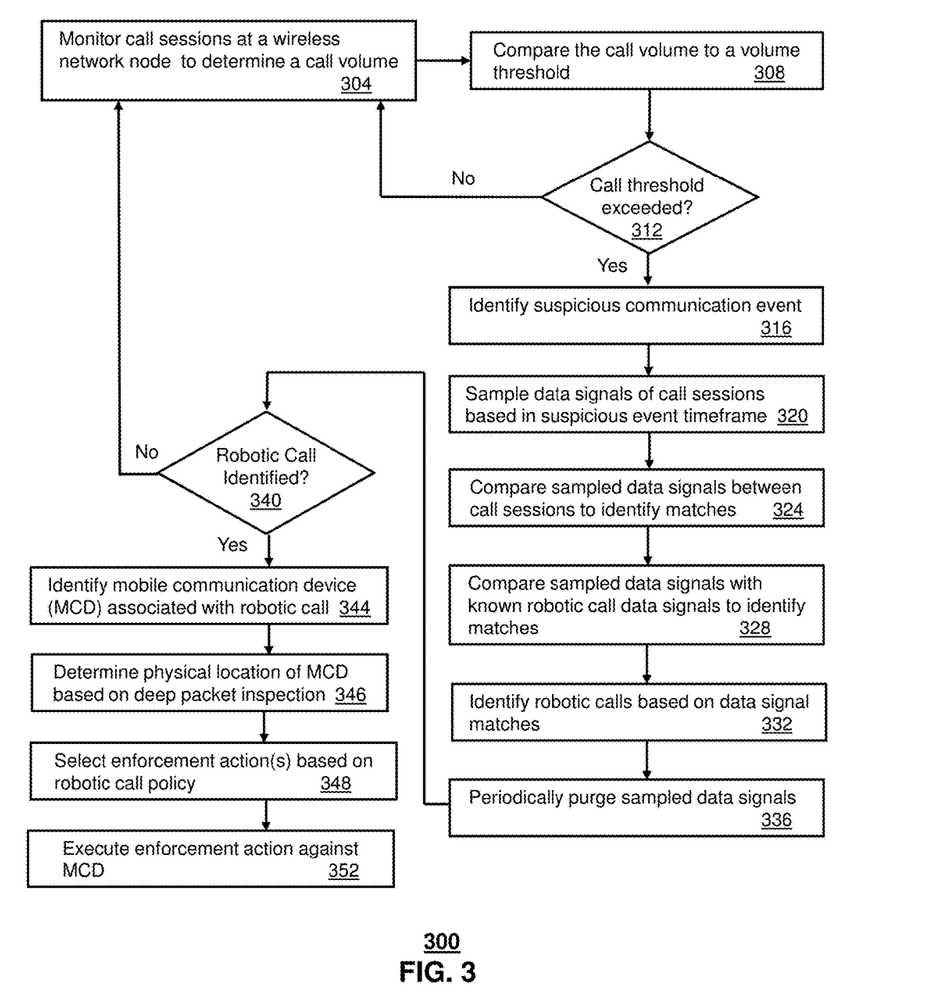
FIG. 3 depicts an illustrative embodiment of a method used in portions of the networks described in FIGS. 1 and 2.

In one or more embodiments, the wireless communication nodes 117A-C, or eNodeB nodes, can include Robotic Call Traffic Management Functions (RCTMF) 130. In another embodiment, the RCTMF 130 can be included at the provider communication network 150. Referring additionally to FIG. 3, an illustrative embodiment of a method used in portions of the systems described in FIGS. 1-2 is shown. At step 304, the RCTMF 130 can monitor information associated with call session traffic at its eNodeB 117A to detect suspicious robotic call events. In one embodiment, a mobile communication device 116 can initiate a calling session that is directed to a second mobile communication device 116B. The RCTMF 130 can monitor this calling session, along with all other calling sessions requested by mobile communication devices 116 at this eNodeB node 117A.

In one or more embodiments, the RCTMF 130 can track the volume of call sessions requested at this eNodeB node 117A, in step 308. For example, the RCTMF can determine a volume of active call sessions that are currently supported using the RF capability of the eNodeB node 117A. In another example, the RCTMF 130 can add up the number of call sessions that have been requested at the eNodeB node 117A over a time period (e.g., one minute, five minutes). In one or more embodiments, the RCTMF 130 can compare the volume of call sessions to a threshold value to determine if an excessive number of call sessions have been requested, in step 312. For example, the RCTMF 130 can determine that a volume of calls over the past five minutes exceeds a five minute volume threshold. Similarly, the RCTMF 130 can determine that a volume of currently active calls exceeds a volume threshold. In one embodiments, the RCTMF 130 can define a detection of an excessive number of call sessions as a triggering indicating a suspicious communication event.

In one or more embodiments, eNodeB node 117A can leverage an internal and/or external Traffic Detection Function (TDF) 136 capability to identify traffic volume that may be associated with suspicious robotic calling. In one embodiment, the RCTMF 130 can identify a suspicious communication event with the detection of a single occurrence of the volume of call sessions exceeding the threshold, in step 316. In another embodiment, the RCTMF 130 can require more than one occurrence of the volume of call sessions exceeding the threshold before triggering an indication of a suspicious communication event. In another embodiment, the RCTMF 130 can vary the threshold for the volume of calls based on instructions from the core provider network 150 and/or a neighboring eNodeB node 117B. For example, the system 100 can be configured to reduce the threshold of calls if a suspicious communication event has been recently or previously detected at this eNodeB node 117A or another eNodeB node 117B or by the core provider network 150.

In one or more embodiments, the RCTMF 130 can receive call session volume information from one or more neighboring eNodeB nodes 117B and 117C. The RCTMF 130 can combine this call session volume information from neighboring nodes 117B and 117C in its geographic area with its own call session volume information and compare the combined call session information with the call threshold. For example, the call session information can be summed together to represent a collective measurement of the calling sessions occurring the entire geographic area covered by the group of eNodeB nodes 117A-C. In one embodiment, the calling session volume information can be weighted differently for different eNodeB nodes 117A-C. For example, calling session information for eNodeB nodes 117B that are closer to this eNodeB node 117A can be weighted higher than information for eNodeB nodes 117C that are farther away.

In one or more embodiments, the RCTMF 130 can report the suspicious calling event to its surrounding geographical area. For example, the RCTMF 130 can report the suspicious calling event to neighboring eNodeB nodes 117B-C. In one embodiment, the RCTMF 130 can query neighboring eNodeB nodes 117B-C to determine whether similar events have happened in the past period of time (e.g., 1 week, 1 month, or 1 year) at these nodes. In response, the eNodeB nodes 117B-C in the surrounding geographical area can look up recent activity stored in their caches 139, or call record databases, and determine whether similar events have happened in the past period of time (e.g., 1 week, 1 month, or 1 year).

In one or more embodiments, if the RCTMF 130 has identified a suspicious communication event, then the eNodeB 117A can perform preprocessing activities on one or more call sessions associated with the suspicious communication event, as in steps 320 through 332. The preprocessing activities can be used by the RCTMF 130 to determine one or more characteristics regarding the content of one or more call sessions associated with the suspicious communication event. In one embodiment, the RCTMF 130 can perform data sampling on one or more of the call sessions that are identified as belonging to the suspicious communication event. In one embodiment, the RCTMF 130 can use a Data Sampling function 134 in step 320. The RCTMF 130 can sample a portion of data of one or more packets of a call session. The data sampling can be implemented to be sufficient for the RCTMF 130 to derive comparable patterns and/or characteristics from call session data while minimizing intrusiveness. For example, the Data Sampling function 134 of the RCTMF 130 can analyze small portions (e.g., snippets) of data over periodic intervals in the call session. The brief and discontinuous data sampling can provide the RCTMF 130 with data signal signatures of sufficient data signal information for use by a comparison and detection algorithms. However, due to their brevity and disconnectedness (including the time period in between the interval of sampling), the data samples will not be useful for determining content or source of the message. Further, any data derived from sampling can be quickly purged from memory as soon as the RCTMF 130 has completed one or more comparison steps. In one or more embodiments, an analysis of data associated with a call session can be subject to authorization from user(s) associated with the data (e.g., a called party), such as an opt-in, an opt-out, acknowledgement requirements, notifications, selective authorization based on calling parties, and so forth.

In one or more embodiments, in step 324, the RCTMF 130 can compare the sampled data signals from different call sessions occurring during the suspicious event timeframe. In one or more embodiments, the RCTMF 130 can use a Pattern Recognition function 135 to compare data samples from call sessions. For example, the RCTMF 130 can compare data samples from a first call session with data samples of a second call session. The nature of the sampling of data snippets can be used to deduce that there should be very little correlation between the data samples of the first and second call sessions unless the first and second call sessions are the product of a recording and/or a robotic calling system. In one or more embodiments, the RCTMF 130 can apply one or more thresholds to the measure of correlation determined by the Pattern Recognition function 135 before the RCTMF 130 can identify two call sessions as "matched." Further, the RCTMF 130 can apply one or more thresholds to the number of call sessions that are "matched" to other call sessions before the RCTMF 130 can identify these call sessions as robotic calls, in step 332.

In one or more embodiments, in step 328, the RCTMF 130 can compare the sampled snippets of data from the particular call sessions occurring during the suspicious event timeframe with data signals from known robotic calls. In one or more embodiments, the RCTMF 130 can use the Pattern Recognition function 135 to compare data samples from the call sessions and a database of known robotic call data samples. The nature of the sampling of data snippets can mean that there should be very little correlation between the data samples of the call sessions and the robotic calls unless the call sessions match the robotic calls. In one or more embodiments, the RCTMF 130 can apply one or more thresholds to the measure of correlation determined by the Pattern Recognition function 135 before the RCTMF 130 can identify a call session as "matched" to a known robotic call. Further, the RCTMF 130 can apply one or more thresholds to the number of call sessions that are "matched" to the robotic calls before the RCTMF 130 can identify these call sessions as robotic calls, in step 332. In one or more embodiments, the RCTMF 130 can purge the data samples that are analyzed.

In one or more embodiments, the RCTMF 130 can detect a pattern in a communication session that correlates with a known pattern of a robotic call in order to protects called parties from robotic calls. In one or more embodiments, this technique can be performed through sampling or other non-invasive methods.

In one or more embodiments, if the RCTMF 130 has identified a call session as a robotic call, in step 340, then, in step 344, the RCTMF 130 can identify a mobile communication device 116 that is responsible for generating the robotic call. For example, header information associated with the calling session can include an identification of the calling device 116, such as a telephone number, a Chip Card Identification (CCID), and/or an International Mobile Equipment Identity (IMEI).

In one or more embodiments, the RCTMF 130 can leverage Advanced Global Positioning System (AGPS) processing to determine physical locations of one or more mobile communication devices 116 associated with the suspicious communication event in step 346. For example, the mobile communication device 116 can include a GPS module that allows the mobile communication device 116 to determine its physical location via signals from a GPS satellite. An AGPS function 138 of the RCTMF 130 can extract this location information from mobile communication devices 116.

In one or more embodiments, in step 348, the RCTMF 130 can access select one or more enforcement actions in response to the identification of the calling session and/or the mobile communication device 116 with a robotic call activity. In one embodiment, the RCTMF 130 can access a Policy Enforcement Function 137, which can select one or more enforcement actions from a group enforcement options. The selection can be based on available information, including a type of the robotic call that is identified (e.g., content, voice pattern, device type, device identification, source identification).

In various embodiments, the RCTMF 130 can perform one or more enforcement actions in step 352. For example, the RCTMF 130 can collect information regarding an identified robotic call session and/or a particular calling device 116 and store this information in a cache 139 for future reference. In another example, the RCTMF 130 can send information regarding the identified robotic call to neighboring eNodeB nodes 117B-C. In another example, the RCTMF 130 can send information regarding the identified robotic call to the core provider network 150 for further processing.

In one embodiment, the Policy Enforcement Function 137 can instruct the RCTMF 130 to stop further processing of the identified robotic call session and/or subsequent robotic call sessions that can be associated to the identified robotic call session by information such as the identity (e.g., telephone number, CCID, IMEI) of the sending device 116 and/or the physical location of the sending device 116. In one embodiment, the RCTMF 130 can instruct other eNodeB nodes 117B-C to likewise halt further processing of call session identified to the robotic call. In one embodiment, eNodeB 117A can stop further entry of an identified mobile communication device 116 into the radio access network (RAN).

In one or more embodiments, the Policy Function RCTMF 130 can instruct the RCTMF 130 to send information regarding the identified robotic call to law enforcement authorities 230. For example, the core provider network 150 can be instructed by the eNodeB 117A to send an alert message with identification and location information for the robotic call session to police 230 and/or a public safety team empowered to apprehend people who involved in robotic calling activity in violation of the law.

In a law enforcement protocol, in one or more embodiments, the core provider network 150 can compare information associated with the identified robotic call with information in a SIM Card bank, an IMEI bank, and/or a RF Front End Bank. The core network 130 can thus confirm an identity, or fingerprint, for a mobile communication device, a collection of mobile communication devices, and/or a "calling truck" associated with the identified robotic call. In one or more embodiments, the core network 150 can determine that the robotic call session is coming from a call truck, where the multiple communication devices 116 including via multiple SIM cards can be automatically controlled, and where multiple outbound calls can be simultaneously generated. In one or more embodiments, the core network can wait for an additional outbound call from the calling truck to trigger contacting authorities.

In one or embodiments, the eNodeB node 117A can detect suspicious robotic call events based on a significantly large number of mobile calls originated in the same geographical area. The eNodeB node 117A can instantaneously and/or concurrently send a broadcast/send/alert indicating the suspicious robotic call event to the surrounding geographical area including neighboring eNodeB nodes 117B-C and can determine whether similar events have happened in the surrounding geographical area during a recent period of time. In one embodiment, the RCTMF 130 can be implemented as a virtual network function (vNF) that can be integrated with a regular telephony service.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring again to FIG. 3, in one or more embodiments, the core provider network 150 can include an Intelligent Call Processing Function (ICPF) 160. The ICPF 160 can include functions for handling suspicious call events and/or calls that have been identified as robotic calls by the RCTMF 130. In one embodiment, the ICPF can include an Entity Identity Database 163, which can include identification information for one or more entities that have been given permission to send robotic calls over the core provider network 150. For example, certain large companies and/or government agencies (e.g., the Internal Revenue Service) and/or political organizations may obtain permission to engage in robotic calling. The Entity Identity Database 163 can include a listing of device identities (e.g., CCID, IMEI, telephone numbers) that are given permission to engage in robotic calling.

In one embodiment, the ICPF 160 can include a Caller Black Listed Database 162. The Caller Black Listed Database 162 can include a listing of device identities (e.g., CCID, IMEI, telephone numbers) that have previously been identified as engaging in unlawful (not permitted) robotic calling. The ICPF 160 can update the Caller Black Listed Database 162 with additional device identities as these devices are identified by the RCTMF 130 and confirmed by the ICPF 160. In one embodiment, the ICPF 160 can include a Profile Quarantine 164. The Profile Quarantine 164 can include be used to store and to manage processing for anomalous device profiles that have been identified as associated with devices that have been identified, at least preliminarily, with robotic calling activities. Device profiles in the Profile Quarantine 164 can be held in quarantine until they can be examined and approved for inclusion in the Caller Black Listed Database 162.

In one embodiment, the ICPF 160 can include a Spoof Detection Function 166. The Spoof Detection Function 166 can process information included with a calling session and can look for evidence that the calling information included with the call does not match the actual identity of the calling device. For example, the calling device 116 may send a Calling Identity (CID) with the calling session to fool a call receiving party into thinking that the call is not a robotic call. In this embodiment, the Spoof Detection Function 166 can extract the actual CID from a header of a data packet associated with the call session and can determine if this actual CID matches an "advertised" CID that has been sent with the call.

In one embodiment, the ICPF 160 can include a Call Denial of Service (DOS) Process 165. The Call DOS Process 165 can determine if a call session, which may have been identified by the RCTMF 130 as a robotic call, is additionally associated with a DOS event. In a DOS event, the calling device 116 is directly or indirectly attempting to tie up resources of the communication system 100 by purposefully overwhelming the system with illegal call sessions. If the Call DOS Process 165 identifies the robotic call as being part of a larger Call DOS scheme, then the ICPF 160 can act to prevent disruptions to the system 100 and, further, may engage with law enforcement.

Figure 4:
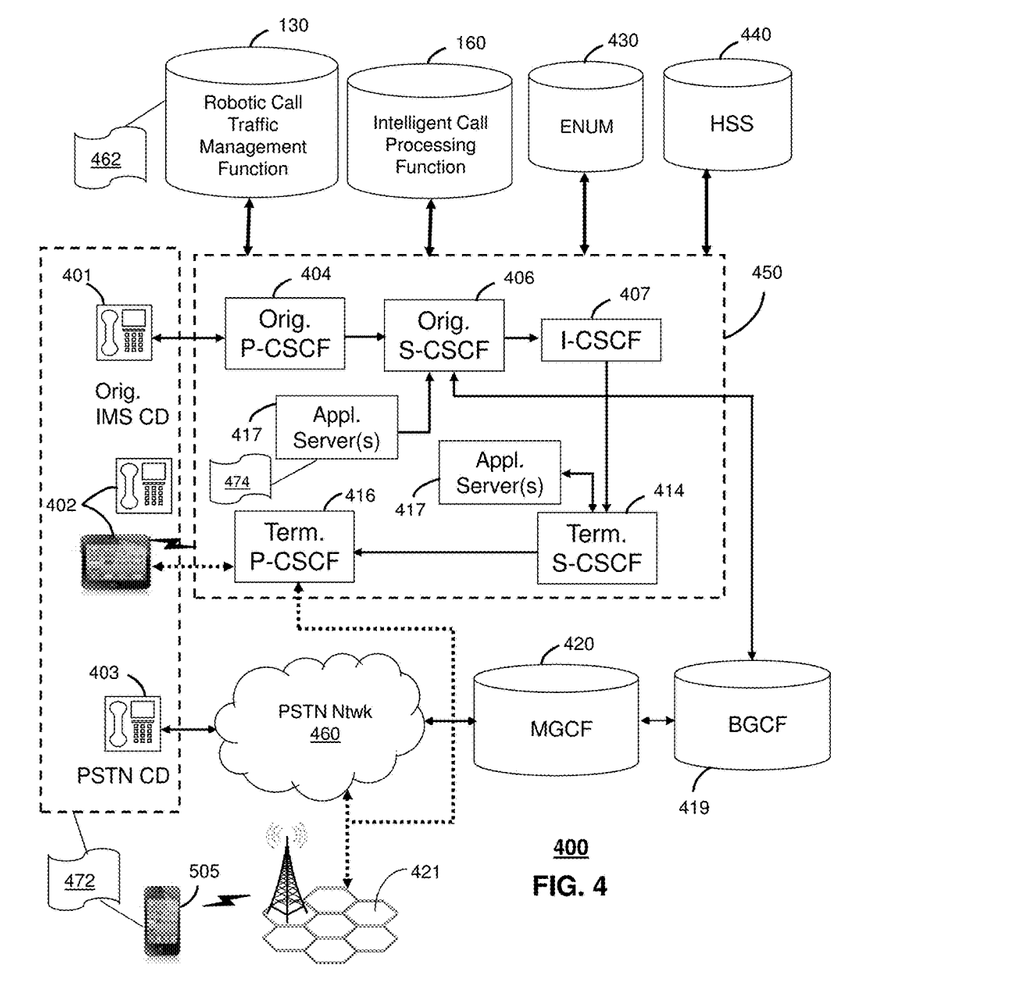
FIG. 4 depicts illustrative embodiments of a communication system that can be used by the communication network of FIG. 1.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 and 200 of FIGS. 1 and/or 2 as another representative embodiment of communication system 400 for protecting customers and communication resources from robotic calling schemes by detecting suspicious calling events, identifying robotic call devices, and taking enforcement actions to prevent further calls.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 400 of FIG. 4.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 400 for purposes similar to those described above. Server 430 can perform function 462 and thereby provide robotic call detection and protection services on behalf of the CDs 401, 402, 403 and 405 of FIG. 4 similar to the functions described for RCTMF 130 of FIG. 1 in accordance with method 300 of FIG. 3. CDs 401, 402, 403 and 405, which can be adapted with software to perform function 472 to utilize the services of the server 430 similar to the functions described for communication devices 100 of FIG. 1 in accordance with method 300 of FIG. 3. Server 430 can be an integral part of the application server(s) 417 performing function 474, which can be substantially similar to function 462 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
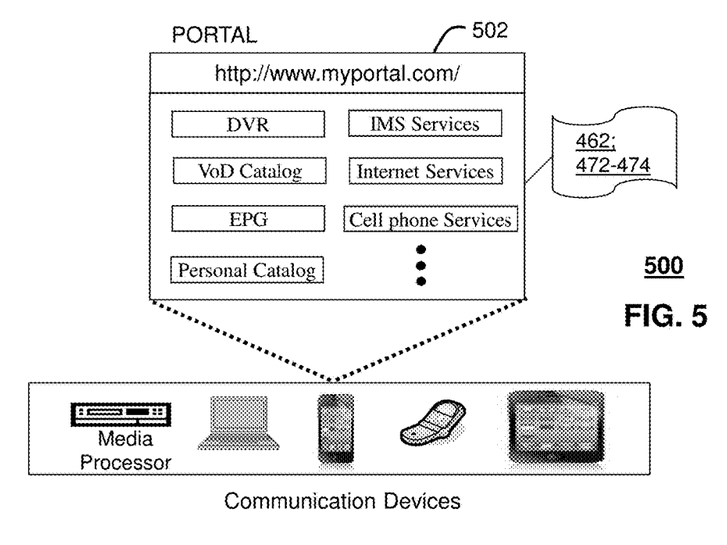
FIG. 5 depicts an illustrative embodiment of a web portal for interacting with the communication systems of FIGS. 1, 2, and 3.

FIG. 5 depicts an illustrative embodiment of a web portal 502 of a communication system 500. Communication system 500 can be overlaid or operably coupled with systems 100 and 200 of FIGS. 1 and/or 2, and/or communication system 400 as another representative embodiment of systems 100 and 200 of FIGS. 1 and/or 2], and/or communication system 400. The web portal 502 can be used for managing services of systems 100 and 200 of FIGS. 1 and/or 2 and communication system 400. A web page of the web portal 502 can be accessed by a Uniform Resource Locator (URL) with an Internet browser using an Internet-capable communication device such as those described in FIGS. 1 and/or 2 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462, 472, and 474 to adapt these applications as may be desired by subscribers and/or service providers of systems 100 and 200 of FIGS. 1 and/or 2, and communication system 400. For instance, users of the services provided by RCTMF 130 or server 430 can log into their on-line accounts and provision the RCTMF 130 or server 430 with device or user profiles as described in FIGS. 1-4, and so on. Service providers can log onto an administrator account to provision, monitor and/or maintain the systems 100 and 200 of FIGS. 1 and/or 2, or server 430.

Figure 6:
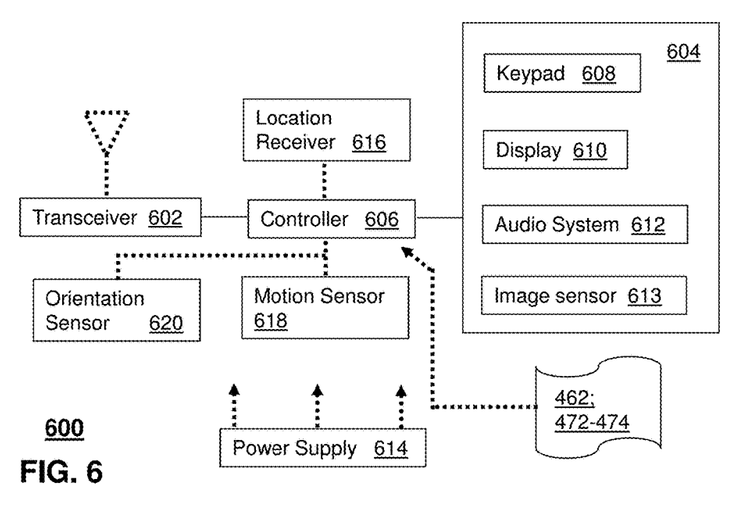
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1 and/or 2, and FIG. 4 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIGS. 1 and/or 2, mobile communication devices 116, as well as the IMS CDs 501-502 and PSTN CDs 503-505 of FIG. 5. It will be appreciated that the communication device 600 can also represent other devices that can operate in systems of FIGS. 1 and/or 2, communication systems 400 of FIG. 4, such as a gaming console and a media player. In addition, the controller 606 can be adapted in various embodiments to perform the functions 462, 472, and 474, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
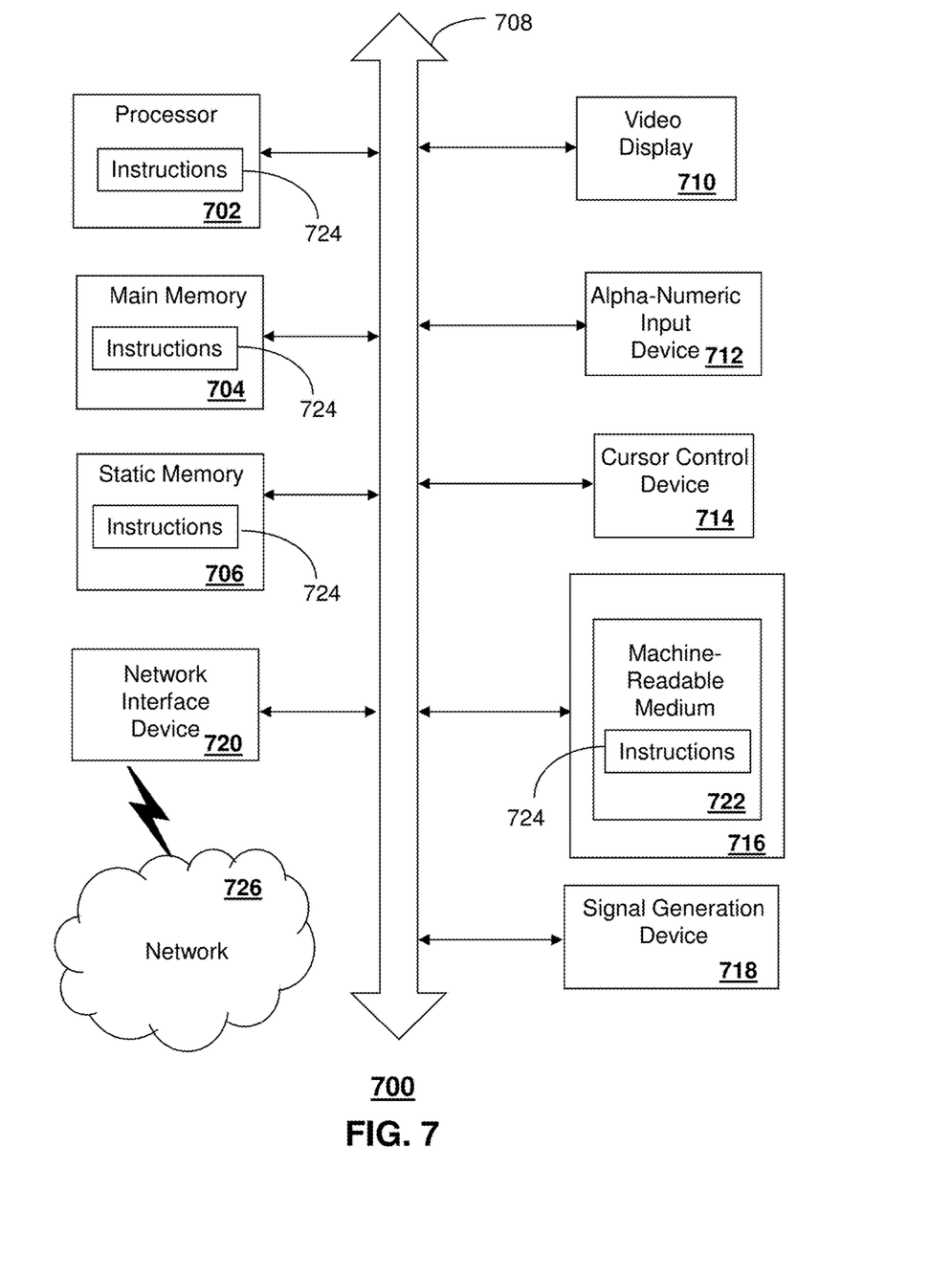
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the server 430, the RCTMF 130 and other devices of FIGS. 1-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information or other collected information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage medium, comprising executable instructions that, when executed by a processing system including a processor, facilitate performance of operations, comprising:
    monitoring call sessions associated with a wireless network node of a communication network to determine a call volume associated with the wireless network node;
    comparing the call volume associated with the wireless network node to a threshold volume to identify a suspicious communication event;
    responsive to identification of the suspicious communication event, sampling data signals of first data packets carried via the call sessions associated with the suspicious communication event to generate first sampled data signals associated with the suspicious communication event;
    comparing the first sampled data signals to second sampled data signals of second data packets associated with known robotic calls to detect robotic call patterns in the first sampled data signals associated with the suspicious communication event;
    identifying robotic calls in the call sessions associated with the suspicious communication event according to detection of the robotic call patterns in the first sampled data signals;
    responsive to identification of the robotic calls:
        identifying a mobile communication device associated with the robotic calls;
        determining an enforcement action for the mobile communication device associated with the robotic calls according to a robotic call policy; and
        executing the enforcement action against the mobile communication device associated with the robotic calls.

2. The machine-readable storage medium of claim 1, wherein the enforcement action includes directing the wireless network node to prohibit subsequent call sessions associated with the mobile communication device.

3. The machine-readable storage medium of claim 2, wherein the enforcement action includes providing identification information associated with the mobile communication device to a second wireless network node of the communication network.

4. The machine-readable storage medium of claim 1, wherein the enforcement action includes providing identification information associated with the mobile communication device to a core function of the communication network.

5. The machine-readable storage medium of claim 4, wherein the core function of the communication network adds the identification information associated with the mobile communication device to a known robotic call device database.

6. The machine-readable storage medium of claim 4, wherein the core function of the communication network compares the identification information associated with the mobile communication device to a permitted robotic call device database.

7. The machine-readable storage medium of claim 4, wherein the core function of the communication network compares the identification information associated with the mobile communication device to a cell identification label provided to the communication network by the mobile communication device.

8. The machine-readable storage medium of claim 4, wherein the core function of the communication network determines if the mobile communication device is associated with a denial of service event.

9. The machine-readable storage medium of claim 1, wherein the operations further comprise determining a location of the mobile communication device associated with the robotic calls, and wherein the mobile communication device is identified according to global positioning system information associated the mobile communication device.

10. The machine-readable storage medium of claim 1, wherein the enforcement action includes providing identification information and location information associated with the mobile communication device to law enforcement authorities.

11. The machine-readable storage medium of claim 1, wherein the robotic call patterns are detected according to the occurrences of matching in the first sampled data signals and the second sampled data signals.

12. The machine-readable storage medium of claim 1, wherein the first data packets are sampled periodically.

13. The machine-readable storage medium of claim 1, wherein the operations further comprise purging the first sampled data signals after the identification of the robotic calls.

14. A wireless network node, comprising:
a processing system including a processor; and
a memory that stores executable instructions that, when executed by the processing system, facilitate performance of operations, comprising:
receiving call sessions accessing a communication network;
determining a call volume associated with the call sessions;
identifying a suspicious communication event according to the call volume;
responsive to identification of the suspicious communication event;
comparing first sampled data signals of first data packets in the call sessions associated with the suspicious communication event to second sampled data signals of second data packets in known robotic calls to detect robotic call patterns in the call sessions;
identifying robotic calls in the call sessions associated with the suspicious communication event according to detection of the robotic call patterns; and
responsive to identification of the robotic calls:
identifying a mobile communication device associated with the robotic calls; and
providing identification information associated with the mobile communication device to a core function of the communication network according to a robotic call policy.

15. The wireless network node of claim 14, wherein the operation further comprise sampling data signals carried via the call sessions associated with the suspicious communication event responsive to identification of the suspicious communication event to generate the first sampled data signals associated with the suspicious communication event.

16. The wireless network node of claim 15, wherein data signals are sampled periodically, and wherein the operations further comprise purging the first sampled data signals after the identification of the robotic calls.

17. The wireless network node of claim 14, wherein the operations further comprise prohibiting subsequent call sessions associated with the mobile communication device.

18. The wireless network node of claim 14, wherein the operations further comprise providing identification information associated with the mobile communication device to a second wireless network node of the communication network.

19. A method, comprising:
comparing, by a processing system including a processor, call volume of call sessions associated with a wireless network node of a communication network to a threshold volume to identify a suspicious communication event;
comparing, by the processing system, first sampled data signals of first data packets in the call sessions identified to the suspicious communication event to second sampled data signals of second data packets in known robotic calls to detect robotic call patterns in the call sessions;
identifying, by the processing system, robotic calls in the call sessions associated with the suspicious communication event based on detection of the robotic call patterns in the call session;
identifying, by the processing system, a mobile communication device associated with the robotic calls; and
providing, by the processing system, identification information associated with the mobile communication device to a core network function of the communication network and a second wireless network node of the communication network according to a robotic call policy.

20. The method of claim 19, further comprising determining a location of the mobile communication device associated with the robotic calls, and wherein the mobile communication device is identified according to global positioning system information associated the mobile communication device.

* * * * *